United States Patent
Yu et al.

(10) Patent No.: US 10,993,278 B2
(45) Date of Patent: Apr. 27, 2021

(54) METHOD AND APPARATUS FOR RECOVERING FROM RADIO DOWNLINK FAILURE

(71) Applicant: Huawei Technologies Co., Ltd., Shenzhen (CN)

(72) Inventors: Haifeng Yu, Beijing (CN); Xin Xiong, Beijing (CN); Feng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/417,267

(22) Filed: May 20, 2019

(65) Prior Publication Data

US 2019/0274180 A1 Sep. 5, 2019

Related U.S. Application Data

(63) Continuation of application No. PCT/CN2017/110931, filed on Nov. 14, 2017.

(30) Foreign Application Priority Data

Nov. 21, 2016 (CN) .......................... 201611040749.4

(51) Int. Cl.
*H04L 12/24* (2006.01)
*H04W 76/18* (2018.01)
(Continued)

(52) U.S. Cl.
CPC ........... *H04W 76/18* (2018.02); *H04W 24/10* (2013.01); *H04W 76/00* (2013.01); *H04W 76/15* (2018.02); *H04W 76/19* (2018.02); *H04W 76/27* (2018.02)

(58) Field of Classification Search
None
See application file for complete search history.

(56) References Cited

U.S. PATENT DOCUMENTS 9,258,747 B2 * 2/2016 Sivanesan .............. H04N 7/147
9,319,917 B2 * 4/2016 Tamura ................. H04W 24/10
(Continued)

FOREIGN PATENT DOCUMENTS

CN 101848536 A 9/2010
CN 102036284 A 4/2011
(Continued)

OTHER PUBLICATIONS

3GPP TR 38.913 V14.0.0 (Oct. 2016);3rd Generation Partnership Project;Technical Specification Group Radio Access Network;Study on Scenarios and Requirements for Next Generation Access Technologies;(Release 14);total 39 pages.
(Continued)

*Primary Examiner* — Sithu Ko
(74) *Attorney, Agent, or Firm* — Slater Matsil, LLP

(57) ABSTRACT

Embodiments of the present invention relate to the field of communications technologies, and disclose a method and an apparatus for recovering from a radio downlink failure. The method includes: monitoring a first radio link to determine whether a radio downlink failure occurs on the first radio link, where the first radio link is a currently connected radio link; if it is detected that the radio downlink failure occurs on the first radio link, starting a physical-layer-monitored automatic-recovery process for the first radio link and starting a Radio Link Control RRC connection re-setup process to set up a second radio link; and recovering from the radio downlink failure through either of the physical-layer-monitored automatic-recovery process and the RRC connection re-setup process.

18 Claims, 7 Drawing Sheets

(51) Int. Cl.
*H04W 76/19* (2018.01)
*H04W 76/27* (2018.01)
*H04W 24/10* (2009.01)
*H04W 76/15* (2018.01)
*H04W 76/00* (2018.01)

(56) References Cited

U.S. PATENT DOCUMENTS

| | | | |
|---|---|---|---|
| 9,730,114 B2 | 8/2017 | Han et al. | |
| 10,530,639 B2* | 1/2020 | Dudda | H04W 24/10 |
| 2010/0291939 A1 | 11/2010 | Jen et al. | |
| 2011/0019532 A1 | 1/2011 | Jung et al. | |
| 2014/0038616 A1* | 2/2014 | Burbidge | H04W 36/18 |
| | | | 455/442 |
| 2014/0050197 A1* | 2/2014 | Legg | H04W 36/0072 |
| | | | 370/331 |
| 2014/0321267 A1* | 10/2014 | Jiang | H04L 45/28 |
| | | | 370/225 |
| 2015/0245407 A1* | 8/2015 | Johansson | H04W 48/17 |
| | | | 370/329 |
| 2015/0271763 A1* | 9/2015 | Balachandran | H04L 43/0811 |
| | | | 370/338 |
| 2015/0282107 A1* | 10/2015 | Vrind | H04W 56/003 |
| | | | 370/252 |
| 2017/0019945 A1* | 1/2017 | Chiba | H04W 76/15 |
| 2018/0132300 A1* | 5/2018 | Viering | H04W 76/38 |

FOREIGN PATENT DOCUMENTS

| | | |
|---|---|---|
| CN | 102056190 | 5/2011 |
| CN | 103200599 A | 7/2013 |
| CN | 105612786 A | 5/2016 |
| WO | 2014071599 A1 | 5/2014 |

OTHER PUBLICATIONS

LG Electronics Inc.,"Support of reliable RRC connection",3GPP TSG-RAN WG2 #96 R2-168422, Reno, USA, Aug. 14-18, 2016, 4 pages.

Nokia,"Analysis of possible solutions for supporting URLLC requirements",3GPP TSG-RAN WG2 Meeting #96 R2-168688, Reno, USA, Nov. 14-18, 2016, 4 pages.

* cited by examiner

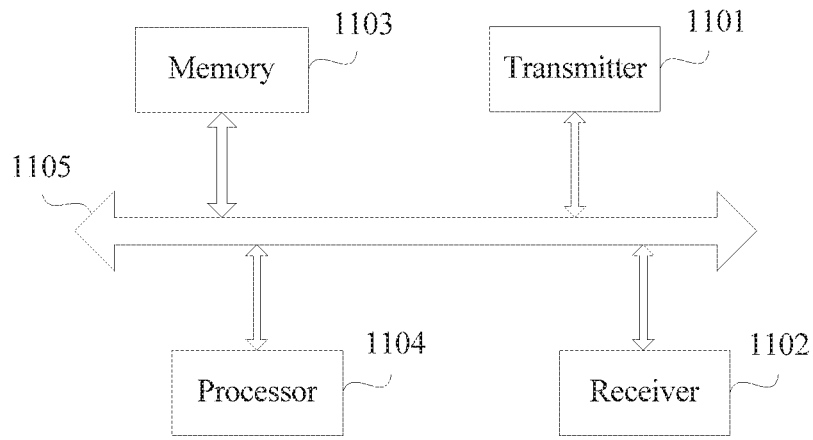

FIG. 1C

```
┌─────────────────────────────────────────────────────────────┐
│ Monitor a first radio link to determine whether a radio     │
│ downlink failure occurs on the first radio link, where the  │─── 201
│ first radio link is a currently connected radio link        │
└─────────────────────────────────────────────────────────────┘
                              ↓
┌─────────────────────────────────────────────────────────────┐
│ If it is detected that the radio downlink failure occurs on │
│ the first radio link, start a physical-layer-monitored      │
│ automatic-recovery process for the first radio link and     │─── 202
│ start a Radio Link Control RRC connection re-setup process  │
│ to set up a second radio link                               │
└─────────────────────────────────────────────────────────────┘
                              ↓
┌─────────────────────────────────────────────────────────────┐
│ Recover from the radio downlink failure through either of   │
│ the physical-layer-monitored automatic-recovery process and │─── 203
│ the RRC connection re-setup process                         │
└─────────────────────────────────────────────────────────────┘
                              ↓
┌─────────────────────────────────────────────────────────────┐
│ Determine a target preset time length, where the target     │
│ preset time length is a maximum value of a second preset    │─── 204
│ time length and a third preset time length                  │
└─────────────────────────────────────────────────────────────┘
                              ↓
┌─────────────────────────────────────────────────────────────┐
│ Enter an idle mode when the first radio link is still in a  │
│ radio downlink failure state after the target preset time   │
│ length expires, where the idle mode is used to indicate     │─── 205
│ that a recovery from the radio downlink failure fails       │
└─────────────────────────────────────────────────────────────┘
```

FIG. 2A

METHOD AND APPARATUS FOR RECOVERING FROM RADIO DOWNLINK FAILURE

CROSS-REFERENCE TO RELATED APPLICATIONS

This application is a continuation of International Application No. PCT/CN2017/110931, filed on Nov. 14, 2017, which claims priority to Chinese Patent Application No. 201611040749.4, filed on Nov. 21, 2016. The disclosures of the aforementioned applications are hereby incorporated by reference in their entireties.

TECHNICAL FIELD

This application relates to the field of communications technologies, and in particular, to a method and an apparatus for recovering from a radio downlink failure.

BACKGROUND

Rapid development of communications technologies brings wide application of radio access networks. In an actual application process, a radio link is usually to be set up between a radio access device (for example, a macro base station) and user equipment (UE) to transmit a service. The UE can implement a plurality of connections, in other words, the UE synchronously maintains downlink synchronization of a plurality of radio links. However, during service transmission, a radio downlink failure may occur on the radio link because of an environmental factor or the like. In this case, to ensure normal service transmission, a recovery from the radio downlink failure needs to be made.

In the current system, a recovery from a radio downlink failure may be made by using the UE. The UE includes a physical layer and a radio resource control (RRC) layer. During radio downlink evaluation, the physical layer continuously monitors quality of a cell reference signal. The cell reference signal includes a positioning reference signal (PRS) and the like. An out-of-synchronization indication is sent to the RRC layer when the physical layer detects that the quality of the cell reference signal is less than a threshold Q1. When the RRC layer receives N310 continuous out-of-synchronization indications, it is determined that the radio downlink failure occurs on the radio link. The RRC layer starts a physical-layer-monitored automatic-recovery process, to recover from the radio downlink failure. To be specific, the RRC layer starts a timer T310, and T310 is configured to time the physical-layer-monitored automatic-recovery process. In addition, the physical layer continues to monitor the quality of the cell reference signal. A synchronization indication is sent to the RRC layer when the physical layer detects that the quality of the cell reference signal is greater than a threshold Q2, and the RCC layer counts a quantity of synchronization indications. If N311 continuous synchronization indications are received in a running period of T310, it is determined that the recovery from the radio downlink failure has been automatically made.

However, if the N311 continuous synchronization indications are not received in the running period of T310, it indicates that the recovery from the radio downlink failure fails to be automatically made. In this case, the UE starts a timer T311, and starts a radio resource control (RRC) connection re-setup process. T311 is configured to time the RRC setup process. To be specific, the UE sends an RRC connection setup request to a radio access device to which a target cell managed by the radio access device belongs, so that the radio access device to which the target cell belongs sets up an RRC connection between the target cell and the UE. Then, the UE may transmit a service by using the RRC connection that has been set up. In other words, it is determined that the recovery from the radio downlink failure has been made through the RRC connection. The target cell may be determined by the UE according to a designated policy. In addition, T310, T311, N310, and N311 may be all configured by the radio access device for the UE in a broadcast manner or by using dedicated signaling.

However, in the provided method for recovering from a radio downlink failure, because both the physical-layer-monitored automatic-recovery process and the RRC connection re-setup process are time-consuming, the recovery from the radio downlink failure needs to be made through the RRC connection re-setup process if it is detected that the recovery from the radio downlink failure fails to be automatically made in the physical-layer-monitored automatic-recovery process. In this way, a latency requirement cannot be met for some ultra-reliable and low latency services.

SUMMARY

Embodiments of the present invention provide a method and an apparatus for recovering from a radio downlink failure, to resolve a prior-art problem. The technical solutions are as follows:

According to a first aspect, a method for recovering from a radio downlink failure is provided, where the method includes monitoring a first radio link to determine whether a radio downlink failure occurs on the first radio link. The first radio link is a currently connected radio link; if it is detected that the radio downlink failure occurs on the first radio link, starting a physical-layer-monitored automatic-recovery process for the first radio link and starting a Radio Link Control RRC connection re-setup process to set up a second radio link. The method further includes recovering from the radio downlink failure through either of the physical-layer-monitored automatic-recovery process and the RRC connection re-setup process.

In a communications network, a radio link usually needs to be set up between a radio access device and the UE to transmit a service. However, in an actual application process, the radio downlink failure may occur on the radio link because of a network coverage factor, an environmental factor, or the like. In this case, to ensure normal service transmission, the currently connected radio link needs to be recovered. To find the radio downlink failure in a timely manner, the UE needs to perform radio link evaluation on the first radio link.

If the radio downlink failure occurs on the first radio link, the UE starts the physical-layer-monitored automatic-recovery process for the first radio link and starts an RRC connection re-setup process to set up a second radio link. After the UE starts the physical-layer-monitored automatic-recovery process and the RRC connection re-setup process, once it is detected that either of the physical-layer-monitored automatic-recovery process and the RRC connection re-setup process is first completed, a radio link obtained through the first completed process may be determined as the first radio link.

In the foregoing process of making the recovery from the radio downlink failure, the physical-layer-monitored automatic-recovery process is prevented from consuming relatively long time when the first radio link cannot automatically recover. The recovery from the radio downlink failure is made through either of the physical-layer-monitored automatic-recovery process and the RRC connection re-setup process, to reduce recovery time, thereby meeting a latency requirement of an ultra-reliable and low latency service.

Optionally, if it is detected that the radio downlink failure occurs on the first radio link, the starting a physical-layer-monitored automatic-recovery process for the first radio link and starting a Radio Link Control RRC connection re-setup process to set up a second radio link includes: when it is detected that the radio downlink failure occurs on the first radio link, starting the physical-layer-monitored automatic-recovery process for the first radio link and simultaneously starting the RRC connection re-setup process to set up the second radio link; or starting the physical-layer-monitored automatic-recovery process for the first radio link when it is detected that the radio downlink failure occurs on the first radio link, and starting the RRC connection re-setup process when the physical-layer-monitored automatic-recovery process meets a preset condition, to set up the second radio link.

That the UE starts the physical-layer-monitored automatic-recovery process for the first radio link and starts the RRC connection re-setup process to set up the second radio link may be implemented in either of the foregoing implementations based on different starting occasions. In this way, manners of starting the physical-layer-monitored automatic-recovery process and the RRC connection re-setup process increase.

Optionally, before the physical-layer-monitored automatic-recovery process meets the preset condition, the method further includes measuring a running time length of the physical-layer-monitored automatic-recovery process. When the measured running time length reaches a first preset time length and the first radio link is still in a radio downlink failure state, determining that the physical-layer-monitored automatic-recovery process meets the preset condition. Or the method includes counting a quantity of out-of-synchronization indications. When the quantity of out-of-synchronization indications reaches a preset quantity, determining that the physical-layer-monitored automatic-recovery process meets the preset condition. The out-of-synchronization indication is generated when it is detected that quality of a first cell reference signal on the first radio link is lower than preset quality.

The RRC connection re-setup process does not need to be started if the first radio link on which the radio downlink failure currently occurs automatically recovers within the first preset time length. However, if the running time length of the physical-layer-monitored automatic-recovery process reaches the first preset time length, and the first radio link is still in the radio downlink failure state, it indicates that the first radio link on which the radio downlink failure currently occurs fails to automatically recover within the first preset time length. In this case, it is determined that the physical-layer-monitored automatic-recovery process meets the preset condition. The RRC connection re-setup process is started to set up the second radio link.

If the UE still detects, after the UE starts the physical-layer-monitored automatic-recovery process, that the quality of the first cell reference signal on the first radio link is lower than the preset quality, and the quantity of out-of-synchronization indications reaches the preset quantity, it indicates that the first radio link fails to automatically recover. Therefore, the UE determines that the physical-layer-monitored automatic-recovery process meets the preset condition. The RRC connection re-setup process is started to set up the second radio link.

Different manners are used above to determine whether the physical-layer-monitored automatic-recovery process meets the preset condition, and therefore, determining manners increase.

Optionally, the recovering from the radio downlink failure through either of the physical-layer-monitored automatic-recovery process and the RRC connection re-setup process includes when it is detected that the physical-layer-monitored automatic-recovery process is successfully implemented, stopping the RRC connection re-setup process and determining. As the first radio link, a radio link obtained after a recovery from the radio downlink failure is made through the physical-layer-monitored automatic-recovery process. When it is detected that the RRC connection re-setup process is successfully implemented, stopping the physical-layer-monitored automatic-recovery process and determining the second radio link as the first radio link. When it is detected that both the physical-layer-monitored automatic-recovery process and the RRC connection re-setup process are successfully implemented, determining quality of a second cell reference signal and quality of a third cell reference signal, and determining a radio link corresponding to a cell reference signal with highest quality in the second cell reference signal and the third cell reference signal as the first radio link. The second cell reference signal is a cell reference signal corresponding to a radio link obtained after a recovery from the radio downlink failure is made through the physical-layer-monitored automatic-recovery process, and the third cell reference signal is a cell reference signal corresponding to the second radio link.

When it is detected that the physical-layer-monitored automatic-recovery process is successfully implemented, it indicates that before RRC connection re-setup is completed, the UE detects that the first radio link automatically recovers. In this case, the RRC connection may not need to be set up. Therefore, the UE stops the RRC connection re-setup process.

When it is detected that the RRC connection re-setup process is successfully implemented, it indicates that before the first radio link on which the radio downlink failure occurs automatically recovers, the RRC connection re-setup process is completed, in other words, the second radio link is set up. In this case, the UE determines the second radio link as the first radio link, in other words, the UE subsequently transmits a to-be-transmitted service by using the setup second radio link. In this case, the UE may stop the physical-layer-monitored automatic-recovery process, in other words, the UE disables a first designated timer.

In a possible implementation, if the UE has sent, when the physical-layer-monitored automatic-recovery process is successfully implemented, an RRC setup request to a radio access device to which a target cell belongs, and the RRC connection re-setup process cannot be successfully canceled, both the physical-layer-monitored automatic-recovery process and the RRC connection re-setup process are successfully implemented. When it is detected that both the physical-layer-monitored automatic-recovery process and the RRC connection re-setup process are successfully implemented, the UE can select, based on quality of a cell reference signal on a radio link obtained after the recovery from the radio downlink failure is made through each process, a radio link obtained through a specific process, to recover from the radio downlink failure.

Optionally, the stopping the RRC connection re-setup process includes sending an RRC cancellation indication to an accessed radio access device, where the RRC cancellation indication carries an identifier of a target cell. The target cell is a cell selected in the RRC connection re-setup process, and the RRC cancellation indication is used to instruct the radio access device to cancel the RRC connection re-setup process based on the identifier of the target cell, to stop the RRC connection re-setup process.

If the UE has sent, when the physical-layer-monitored automatic-recovery process is successfully implemented, the RRC setup request to the radio access device to which the target cell belongs, the RRC connection re-setup process may be canceled through an X2 interface between radio access devices. To be specific, the UE sends the RRC cancellation indication to the radio access device, and the radio access device sends, through the X2 interface based on the identifier of the target cell that is carried in the RRC cancellation indication, an RRC connection cancellation request to the radio access device to which the target cell belongs, to cancel the RRC connection re-setup process. In this way, signaling exchange between the UE and another radio access device may be reduced.

Optionally, before the starting the RRC connection re-setup process to set up the second radio link, the method further includes receiving pre-configuration information sent by an accessed radio access device. The pre-configuration information includes a timing advance TA list and resource pool information of a plurality of cells, the TA list is used to store advanced time required for sending a signal to each cell in the plurality of cells, the resource pool information is used to indicate an uplink resource required for transmitting a signal to each cell in the plurality of cells, and the plurality of cells include a cell managed by the radio access device and/or a cell managed by another radio access device connected to the radio access device. Correspondingly, the starting the RRC connection re-setup process to set up the second radio link includes: starting the RRC connection re-setup process based on the timing advance TA list and the resource pool information to set up the second radio link.

When the RRC connection re-setup process is being started, because the UE needs to learn of time and an uplink resource for sending an RRC setup request to the radio access device to which the target cell belongs, in this embodiment of the present invention, the pre-configuration information is sent to the UE when access of the UE is detected. Correspondingly, the UE receives the pre-configuration information sent by the radio access device. In this way, when the UE needs to start the RRC connection re-setup process, the UE can directly determine, based on the pre-configuration information obtained in advance, time and a required uplink resource for sending the RRC setup request to the target cell. In other words, the UE starts the RRC connection re-setup process based on the timing advance TA list and the resource pool information to set up the second radio link.

Before the RRC connection re-setup process is started, the radio access device sends, to the UE, the pre-configuration information that includes the TA list and the resource pool information, so that the UE directly determines, based on the pre-configuration information obtained in advance, the time and the required uplink resource for sending the RRC setup request to the target cell, thereby reducing time consumed by the RRC connection re-setup process, to reduce time of the recovery from the radio downlink failure.

Optionally, before the starting a physical-layer-monitored automatic-recovery process for the first radio link, the method further includes: receiving a broadcast message sent by an accessed radio access device. The broadcast message carries a first designated correspondence, the first designated correspondence is used to indicate a correspondence between a plurality of service types and a plurality of second preset time lengths. Each second preset time length is a running time length of a first designated timer that is corresponding to each service type in the physical-layer-monitored automatic-recovery process, and the first designated timer is used to time the physical-layer-monitored automatic-recovery process. Correspondingly, the starting a physical-layer-monitored automatic-recovery process for the first radio link includes: determining, in the first designated correspondence based on a service type of a to-be-transmitted service, a second preset time length corresponding to the service type. The method further includes starting the physical-layer-monitored automatic-recovery process for the first radio link and setting the running time length of the first designated timer to the determined second preset time length.

The running time length of the first designated timer may be set to different values based on different service types. Generally, the correspondence between a plurality of service types and a plurality of second preset time lengths needs to be determined by the radio access device. In addition, the radio access device sends the broadcast message to the UE before the physical-layer-monitored automatic-recovery process is started, to send the correspondence between a plurality of service types and a plurality of second preset time lengths to the UE. The UE receives the broadcast message sent by the radio access device, and when the physical-layer-monitored automatic-recovery process needs to be started, the UE starts the physical-layer-monitored automatic-recovery process based on a service type of a to-be-transmitted service and the first designated correspondence.

For different types of services, different second preset time lengths are correspondingly configured for the first designated timer, and therefore, service transmission flexibility is improved.

Optionally, the broadcast message carries a second designated correspondence, the second designated correspondence is used to indicate a correspondence between a plurality of service types and a plurality of third preset time lengths, each third preset time length is a running time length of a second designated timer that is corresponding to each service type in the RRC connection re-setup process, and the second designated timer is used to time the RRC connection re-setup process; and correspondingly, the starting the RRC connection re-setup process to set up the second radio link includes: determining, in the second designated correspondence based on the service type of the to-be-transmitted service, a third preset time length corresponding to the service type; and starting the RRC connection re-setup process to set up the second radio link and setting the running time length of the second designated timer to the determined third preset time length.

For different types of services, different third preset time lengths are correspondingly configured for the second designated timer, and therefore, service transmission flexibility is improved.

Optionally, if it is detected that the radio downlink failure occurs on the first radio link, after the starting a physical-layer-monitored automatic-recovery process and starting a Radio Link Control RRC connection re-setup process to set up a second radio link, the method further includes determining a target preset time length, where the target preset time length is a maximum value of the second preset time length and the third preset time length; and entering an idle mode when the first radio link is still in a radio downlink failure state after the target preset time length expires, where the idle mode is used to indicate that the recovery from the radio downlink failure fails.

When the recovery from the radio downlink failure is being made through either of the physical-layer-monitored automatic-recovery process and the RRC connection re-setup process, the UE enters the idle (idle) mode if the recovery has not been made after a timer with a longest time length in the physical-layer-monitored automatic-recovery process and the RRC connection re-setup process, and therefore, it indicates that the recovery from the radio downlink failure fails.

According to a second aspect, a method for recovering from a radio downlink failure is provided, where the method is applied to a radio access device and includes receiving a Radio Link Control RRC cancellation indication sent by user equipment UE. The RRC cancellation indication carries an identifier of a target cell and the target cell is a cell selected in an RRC connection re-setup process. The method further includes determining, based on the identifier of the target cell, whether the target cell belongs to a managed cell. If the target cell belongs to the managed cell, stopping RRC connection re-setup between the target cell and the UE. Or if the target cell does not belong to the managed cell, sending an RRC connection cancellation request to a radio access device to which the target cell belongs. The RRC connection cancellation request is used to instruct the radio access device to which the target cell belongs to stop RRC connection re-setup between the target cell and the UE.

When the RRC cancellation indication is received, the RRC connection re-setup process is canceled, to be specific, the RRC connection re-setup process is canceled by using the radio access device, thereby reducing signaling exchange between the UE and another radio access device.

Optionally, the method further includes determining pre-configuration information based on stored first information and second information when access of the UE is detected. The first information includes advanced time and information about an uplink resource that are required for sending a signal to each managed cell. The second information includes advanced time and information about an uplink resource that are required for sending a signal to each cell managed by a radio access device connected to the radio access device. The method further includes sending the pre-configuration information to the UE, where the pre-configuration information includes a timing advance TA list and resource pool information of a plurality of cells. The TA list is used to store advanced time required for sending a signal to each cell in the plurality of cells. The resource pool information is used to indicate an uplink resource required for transmitting a signal to each cell in the plurality of cells, and the plurality of cells include a managed cell and/or a cell managed by another radio access device connected to the radio access device.

When the access of the UE is detected, the pre-configuration information is determined and sent to the UE based on the stored first information and second information. Therefore, when the UE needs to start the RRC connection re-setup process, the UE can directly determine, based on the pre-configuration information obtained in advance, time and a required uplink resource for sending the RRC setup request to the target cell. In other words, the UE starts the RRC connection re-setup process based on the timing advance TA list and the resource pool information to set up the second radio link.

Before the RRC connection re-setup process is started, the radio access device sends, to the UE, the pre-configuration information that includes the TA list and the resource pool information, so that the UE directly determines, based on the pre-configuration information obtained in advance, the time and the required uplink resource for sending the RRC setup request to the target cell, thereby reducing time consumed by the RRC connection re-setup process, to reduce time of the recovery from the radio downlink failure.

Optionally, before the determining pre-configuration information based on stored first information and second information, the method further includes receiving and storing the second information sent by the radio access device connected to the radio access device.

To determine the pre-configuration information based on the stored first information and second information when the UE performs accessing, the radio access device receives and stores, when transmitting information with the another radio access device connected to the radio access device, the second information sent by the radio access device connected to the radio access device.

Optionally, the method further includes sending a broadcast message to the UE, where the broadcast message carries a first designated correspondence, the first designated correspondence is used to indicate a correspondence between a plurality of service types and a plurality of second preset time lengths. Each second preset time length is a running time length of a first designated timer that is corresponding to each service type in a physical-layer-monitored automatic-recovery process, and the first designated timer is used to time the physical-layer-monitored automatic-recovery process.

For different types of services, different second preset time lengths are correspondingly configured for the first designated timer, and therefore, service transmission flexibility is improved.

Optionally, the broadcast message further carries a second designated correspondence, the second designated correspondence is used to indicate a correspondence between a plurality of service types and a plurality of third preset time lengths, each third preset time length is a running time length of a second designated timer that is corresponding to each service type in the RRC connection re-setup process, and the second designated timer is used to time the RRC connection re-setup process.

For different types of services, different third preset time lengths are correspondingly configured for the second designated timer, and therefore, service transmission flexibility is improved.

According to a third aspect, an apparatus for recovering from a radio downlink failure is provide. The apparatus is applied to user equipment and includes a monitoring module, configured to monitor a first radio link to determine whether a radio downlink failure occurs on the first radio link, where the first radio link is a currently connected radio link. The apparatus includes a starting module, configured to: if the monitoring module detects that the radio downlink failure occurs on the first radio link, start a physical-layer-monitored automatic-recovery process for the first radio link and start a Radio Link Control RRC connection re-setup process to set up a second radio link. The apparatus includes a recovery module, configured to recover from the radio downlink failure through either of the physical-layer-monitored automatic-recovery process and the RRC connection re-setup process that are started by the starting module.

Optionally, the starting module includes a first start unit, configured to: when it is detected that the radio downlink failure occurs on the first radio link, start the physical-layer-monitored automatic-recovery process for the first radio link and simultaneously start the RRC connection re-setup process to set up the second radio link. The starting module further includes a second start unit, configured to: start the physical-layer-monitored automatic-recovery process for the first radio link when it is detected that the radio downlink failure occurs on the first radio link, and start the RRC connection re-setup process when the physical-layer-monitored automatic-recovery process meets a preset condition, to set up the second radio link.

Optionally, the starting module further includes: a first determining unit, configured to: measure a running time length of the physical-layer-monitored automatic-recovery process, and when the measured running time length reaches a first preset time length and the first radio link is still in a radio downlink failure state, determine that the physical-layer-monitored automatic-recovery process meets the preset condition. The starting module further includes a second determining unit, configured to: count a quantity of out-of-synchronization indications, and when the quantity of out-of-synchronization indications reaches a preset quantity, determine that the physical-layer-monitored automatic-recovery process meets the preset condition, where the out-of-synchronization indication is generated when it is detected that quality of a first cell reference signal on the first radio link is lower than preset quality.

Optionally, the recovery module includes a third determining unit, configured to: when it is detected that the physical-layer-monitored automatic-recovery process is successfully implemented, stop the RRC connection re-setup process and determine, as the first radio link, a radio link obtained after a recovery from the radio downlink failure is made through the physical-layer-monitored automatic-recovery process. The recovery module further includes a fourth determining unit, configured to: when it is detected that the RRC connection re-setup process is successfully implemented, stop the physical-layer-monitored automatic-recovery process and determine the second radio link as the first radio link. The recovery module further includes a fifth determining unit, configured to: when it is detected that both the physical-layer-monitored automatic-recovery process and the RRC connection re-setup process are successfully implemented, determine quality of a second cell reference signal and quality of a third cell reference signal, and determine a radio link corresponding to a cell reference signal with highest quality in the second cell reference signal and the third cell reference signal as the first radio link, where the second cell reference signal is a cell reference signal corresponding to the radio link obtained after the recovery from the radio downlink failure is made through the physical-layer-monitored automatic-recovery process, and the third cell reference signal is a cell reference signal corresponding to the second radio link.

Optionally, the recovery module further includes: a sending unit, configured to send an RRC cancellation indication to an accessed radio access device, where the RRC cancellation indication carries an identifier of a target cell, the target cell is a cell selected in the RRC connection re-setup process, and the RRC cancellation indication is used to instruct the radio access device to cancel the RRC connection re-setup process based on the identifier of the target cell, to stop the RRC connection re-setup process.

Optionally, the starting module further includes: a first receiving unit, configured to receive pre-configuration information sent by an accessed radio access device, where the pre-configuration information includes a timing advance TA list and resource pool information of a plurality of cells, the TA list is used to store advanced time required for sending a signal to each cell in the plurality of cells, the resource pool information is used to indicate an uplink resource required for transmitting a signal to each cell in the plurality of cells, and the plurality of cells include a cell managed by the radio access device and/or a cell managed by another radio access device connected to the radio access device. The starting module further includes a third start unit, configured to start the RRC connection re-setup process based on the timing advance TA list and the resource pool information to set up the second radio link.

Optionally, the starting module further includes: a second receiving unit, configured to receive a broadcast message sent by an accessed radio access device. The broadcast message carries a first designated correspondence, the first designated correspondence is used to indicate a correspondence between a plurality of service types and a plurality of second preset time lengths, each second preset time length is a running time length of a first designated timer that is corresponding to each service type in the physical-layer-monitored automatic-recovery process, and the first designated timer is used to time the physical-layer-monitored automatic-recovery process. The starting module further includes a sixth determining unit, configured to determine, in the first designated correspondence based on a service type of a to-be-transmitted service, a second preset time length corresponding to the service type. The starting module further includes a first setting unit, configured to: start the physical-layer-monitored automatic-recovery process for the first radio link and set the running time length of the first designated timer to the determined second preset time length.

Optionally, the broadcast message carries a second designated correspondence, the second designated correspondence is used to indicate a correspondence between a plurality of service types and a plurality of third preset time lengths, each third preset time length is a running time length of a second designated timer that is corresponding to each service type in the RRC connection re-setup process, and the second designated timer is used to time the RRC connection re-setup process.

Correspondingly, the starting module further includes: a seventh determining unit, configured to determine, in the second designated correspondence based on the service type of the to-be-transmitted service, a third preset time length corresponding to the service type. The starting module further includes a second setting unit, configured to: start the RRC connection re-setup process to set up the second radio link and set the running time length of the second designated timer to the determined third preset time length.

Optionally, the apparatus further includes a determining module, configured to determine a target preset time length, where the target preset time length is a maximum value of the second preset time length and the third preset time length. The apparatus further includes an entering module, configured to enter an idle mode when the first radio link is still in a radio downlink failure state after the target preset time length expires, where the idle mode is used to indicate that the recovery from the radio downlink failure fails.

According to a fourth aspect, an apparatus for recovering from a radio downlink failure is provided, where the apparatus is applied to a radio access device and includes: a first receiving module, configured to receive a Radio Link Control RRC cancellation indication sent by user equipment UE, where the RRC cancellation indication carries an identifier of a target cell and the target cell is a cell selected in an RRC connection re-setup process. The apparatus further includes a judging module, configured to determine, based on the identifier of the target cell, whether the target cell belongs to a managed cell. The apparatus further includes a stopping module, configured to: stop RRC connection re-setup between the target cell and the UE when the target cell belongs to the managed cell. The apparatus further includes a first sending module, configured to: when the target cell does not belong to the managed cell, send an RRC connection cancellation request to a radio access device to which the target cell belongs, where the RRC connection cancellation request is used to instruct the radio access device to which the target cell belongs to stop RRC connection re-setup between the target cell and the UE.

Optionally, the apparatus further includes: a determining module, configured to determine pre-configuration information based on stored first information and second information when access of the UE is detected. The first information includes advanced time and information about an uplink resource that are required for sending a signal to each managed cell, and the second information includes advanced time and information about an uplink resource that are required for sending a signal to each cell managed by a radio access device connected to the radio access device. The apparatus further includes a second sending module, configured to send the pre-configuration information to the UE. The pre-configuration information includes a timing advance TA list and resource pool information of a plurality of cells, the TA list is used to store advanced time required for sending a signal to each cell in the plurality of cells. The resource pool information is used to indicate an uplink resource required for transmitting a signal to each cell in the plurality of cells, and the plurality of cells include a managed cell and/or a cell managed by another radio access device connected to the radio access device.

Optionally, the apparatus further includes a second receiving module, configured to receive and store the second information sent by the radio access device connected to the radio access device.

Optionally, the apparatus further includes: a third sending module, configured to send a broadcast message to the UE. The broadcast message carries a first designated correspondence, the first designated correspondence is used to indicate a correspondence between a plurality of service types and a plurality of second preset time lengths. Each second preset time length is a running time length of a first designated timer that is corresponding to each service type in a physical-layer-monitored automatic-recovery process, and the first designated timer is used to time the physical-layer-monitored automatic-recovery process.

Optionally, the broadcast message further carries a second designated correspondence, the second designated correspondence is used to indicate a correspondence between a plurality of service types and a plurality of third preset time lengths, each third preset time length is a running time length of a second designated timer that is corresponding to each service type in the RRC connection re-setup process, and the second designated timer is used to time the RRC connection re-setup process.

According to a fifth aspect, UE is provided, and the UE includes a transmitter, a receiver, a memory, and a processor; each of the memory, the transmitter, and the receiver is connected to the processor; the memory stores program code; and the processor is configured to invoke the program code, to perform the method for recovering from a radio downlink failure according to the first aspect.

According to a sixth aspect, a radio access device is provided, and the radio access device includes a transmitter, a receiver, a memory, and a processor; each of the memory, the transmitter, and the receiver is connected to the processor; the memory stores program code; and the processor is configured to invoke the program code, to perform the method for recovering from a radio downlink failure according to the second aspect.

According to a seventh aspect, a computer storage medium is provided, and is configured to store a computer software instruction used by the foregoing apparatus for recovering from a radio downlink failure, or store a program designed for the foregoing apparatus for recovering from a radio downlink failure according to the first aspect or the second aspect.

According to an eighth aspect, an embodiment of the present invention further provides a communications chip, and the communications chip is applied to UE. The communications chip includes an input/output interface, a memory, and at least one processor. The memory and the input/output interface bidirectionally communicate with the at least one processor by using a bus. The memory stores program code. The at least one processor is configured to invoke the program code, so that the UE performs the method for recovering from a radio downlink failure according to the first aspect.

According to a ninth aspect, an embodiment of the present invention further provides a communications chip, and the communications chip is applied to a radio access device. The communications chip includes an input/output interface, a memory, and at least one processor. The memory and the input/output interface bidirectionally communicate with the at least one processor by using a bus. The memory stores program code. The at least one processor is configured to invoke the program code, so that the radio access device performs the method for recovering from a radio downlink failure according to the second aspect.

Technical effects obtained in the third aspect to the sixth aspect are similar to technical effects obtained through a corresponding technical means in the first aspect and the second aspect. Details are not described herein again.

The technical solutions provided in the embodiments of the present invention bring the following beneficial effects. The currently connected first radio link is monitored to determine whether the radio downlink failure occurs on the first radio link. If it is detected that the radio downlink failure occurs on the first radio link, the UE starts, in parallel, the physical-layer-monitored automatic-recovery process and the RRC connection re-setup process, to make the recovery from the radio downlink failure through either of the physical-layer-monitored automatic-recovery process and the RRC connection re-setup process. In this way, in a process of making the recovery from the radio downlink failure, the physical-layer-monitored automatic-recovery process is prevented from consuming relatively long time when the first radio link cannot automatically recover. The recovery from the radio downlink failure is made through either of the physical-layer-monitored automatic-recovery process and the RRC connection re-setup process, to reduce recovery time, thereby meeting a latency requirement of an ultra-reliable and low latency service.

BRIEF DESCRIPTION OF THE DRAWINGS

FIG. 1C is a schematic structural diagram of a radio access device 110 according to an example embodiment;

FIG. 2A is a flowchart of a method for recovering from a radio downlink failure according to an example embodiment;

DETAILED DESCRIPTION OF ILLUSTRATIVE EMBODIMENTS

To make the objectives, technical solutions, and advantages of the embodiments of the present invention clearer, the following further describes the implementations of the present invention in detail with reference to the accompanying drawings.

Figure 1A:
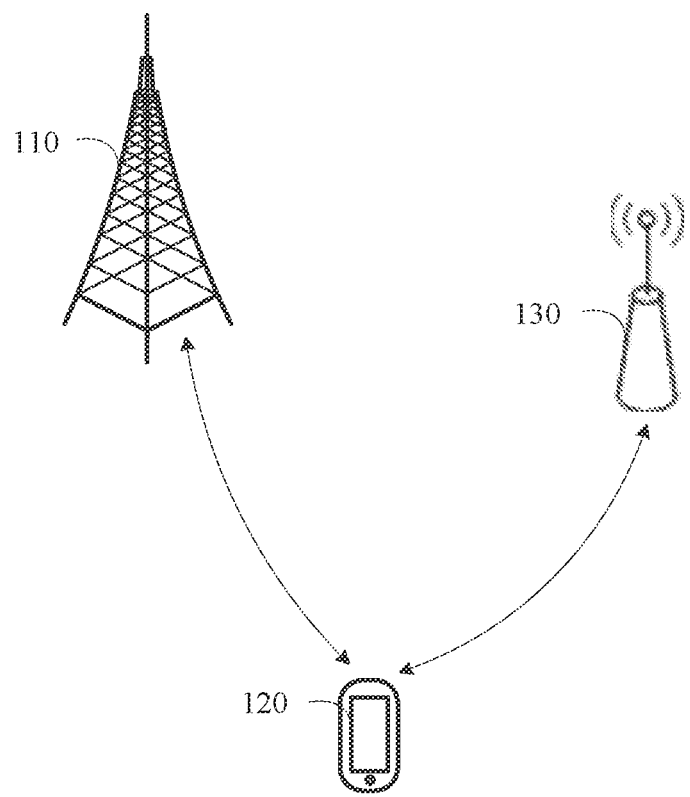
FIG. 1A is a schematic diagram of an implementation environment according to an example embodiment.

FIG. 1A is a schematic diagram of an implementation environment according to an example embodiment. In the implementation environment, a radio access device 11o, UE 120, and at least one radio access node 130 are mainly included. The UE 120 can support a plurality of connections. In other words, the UE 120 can maintain downlink synchronization of a plurality of radio links, and the plurality of radio links include the radio access device 110, the radio access node 130, and the like. In other words, for the UE 120, the plurality of radio links may serve the UE 120.

It should be noted that, one radio access node 130 shown herein is used only as an example. In an actual application scenario, there may be a plurality of radio access nodes 130. Details are not described herein.

The radio access device 110 may be a macro base station or the like, and may be configured to: send data such as a broadcast message and pre-configuration information to the UE 120, cancel an RRC connection re-setup process and the like after receiving an RRC cancellation indication sent by the UE 120, or the like. The radio access node 130 may be referred to as a small cell (small cell), and the radio access node 130 may be managed by the radio access device 110 or another radio access device. This is not limited in this embodiment of the present invention.

Figure 1B:
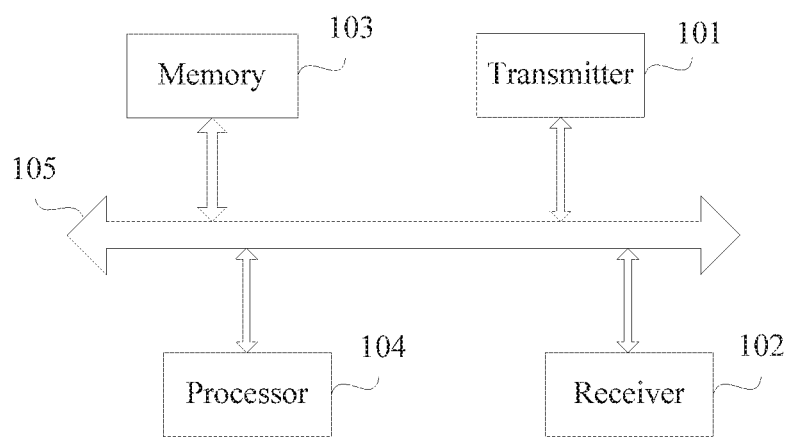
FIG. 1B is a schematic structural diagram of UE 120 according to an example embodiment.

The UE 120 is mainly configured to implement a method for recovering from a radio downlink failure that is provided in this embodiment of the present invention. The UE 120 may be a terminal such as a mobile phone. FIG. 1B is a schematic structural diagram of UE 120 according to an example embodiment. The UE 120 mainly includes a transmitter 101, a receiver 102, a memory 103, a processor 104, and a communications bus 105. A person skilled in the art may understand that a structure of the UE 120 shown in FIG. 1B does not constitute a limitation on the UE 120. The structure may include more or fewer components than those shown in the figure, or combine some components, or have a different component arrangement. This is not limited in this embodiment of the present invention.

The transmitter 101 may be configured to send data, signaling, and/or the like to the radio access device 110 and the radio access node 130. The receiver 102 may be configured to receive data, signaling, and/or the like that are or is sent by the radio access device 110 and the radio access node 130.

The memory 103 may be configured to store data sent by the radio access device 110 and the radio access node 130, and the memory 103 may also be configured to store one or more running programs and/or modules that are used to perform the method for recovering from a radio downlink failure. The memory 103 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of an instruction or a data structure and that can be accessed by an integrated circuit. However, the memory 103 is not limited to the above. The memory 103 may be independent, and is connected to the processor 104 by using the communications bus 105. Alternatively, the memory 103 may be integrated with the processor 104.

The processor 104 is a control center of the UE 120. The processor 104 may be a general-purpose central processing unit (CPU), a microprocessor, an application-specific integrated circuit (ASIC), or one or more integrated circuits configured to control program execution of the solution. The processor 104 may perform or run a software program and/or a module stored in the memory 103 and invoke data stored in the memory 103, to implement the method for recovering from a radio downlink failure that is related to UE in the following embodiment in FIG. 2A.

In addition, the communications bus 105 may include a path, to transfer information between the processor 104 and the memory 103.

FIG. 1C is a schematic structural diagram of a radio access device 110 according to an example embodiment. The radio access device 110 mainly includes a transmitter 1101, a receiver 1102, a memory 1103, a processor 1104, and a communications bus 1105. A person skilled in the art may understand that a structure of the radio access device 11o shown in FIG. 1C does not constitute a limitation on the radio access device 110. The structure may include more or fewer components than those shown in the figure, or combine some components, or have a different component arrangement. This is not limited in this embodiment of the present invention.

The transmitter 1101 may be configured to send data, signaling, and/or the like to the UE 120 and the radio access node 130. The receiver 1102 may be configured to receive data, signaling, and/or the like that are or is sent by the UE 120 and the radio access node 130.

The memory 1103 may be configured to store data sent by the UE 120 and the radio access node 130, and the memory 1103 may also be configured to store one or more running programs and/or modules that are used to perform the method for recovering from a radio downlink failure. The memory 103 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of an instruction or a data structure and that can be accessed by an integrated circuit. However, the memory 103 is not limited to the above. The memory 1103 may be independent, and is connected to the processor 1104 by using the communications bus 1105. Alternatively, the memory 1103 may be integrated with the processor 1104.

The processor 1104 is a control center of the radio access device 110. The processor 1104 may be a general-purpose central processing unit (CPU), a microprocessor, an application-specific integrated circuit (ASIC), or one or more integrated circuits configured to control program execution of the solution. The processor 1104 may perform or run a software program and/or a module stored in the memory 1103 and invoke data stored in the memory 1103, to implement the method for recovering from a radio downlink failure that is related to a radio access device in the following embodiment in FIG. 2A.

In addition, the communications bus 1105 may include a path, to transfer information between the processor 1104 and the memory 1103.

FIG. 2A is a flowchart of a method for recovering from a radio downlink failure according to an example embodiment. This embodiment of the present invention is described by using an example in which the method for recovering from a radio downlink failure is applied to UE. The method for recovering from a radio downlink failure may include the following several steps.

Step 201: Monitor a first radio link to determine whether a radio downlink failure occurs on the first radio link, where the first radio link is a currently connected radio link.

In a communications network, a radio link usually needs to be set up between a radio access device and the UE to transmit a service. However, in an actual application process, the radio downlink failure may occur on the radio link because of a network coverage factor, an environmental factor, or the like. In this case, to ensure normal service transmission, the currently connected radio link needs to be recovered. For ease of description, in this embodiment of the present invention, the currently connected radio link is referred to as the first radio link.

To find the radio downlink failure in a timely manner, the UE needs to perform radio link evaluation (RLM) on the first radio link. Therefore, a radio access device accessed by the UE sends configuration information of RLM to the UE when detecting access of the UE. The configuration information includes information used to indicate a first cell reference signal that needs to be measured to evaluate the first radio link, so that the UE can evaluate the first radio link based on the information about the first cell reference signal.

A specific implementation process in which the UE evaluates the first radio link based on the information about the first cell reference signal may include the following steps 2011 and 2012.

2011. Measure quality of the first cell reference signal based on stored information about the first cell reference signal.

As described above, when accessing the radio access device, the UE receives the information about the first cell reference signal that is sent by the radio access device. Therefore, the UE can measure the quality of the first cell reference signal based on the stored information about the first cell reference signal.

In a possible implementation, the UE can measure the quality of the first cell reference signal at intervals of a designated measurement time length. An indication of the designated measurement time length may be made by the radio access device. In other words, the configuration information may further carry the designated measurement time length.

It should be noted that, that the UE measures the quality of the first cell reference signal at intervals of a designated measurement time length is used only as an example. In another embodiment, the UE may measure the quality of the first cell reference signal according to another policy. For example, the UE may continuously measure the quality of the first cell reference signal. This is not limited in this embodiment of the present invention.

2012. Determine, based on the quality of the first cell reference signal, whether the radio downlink failure occurs on the first radio link.

After obtaining the quality of the first cell reference signal through measurement, the UE can determine, based on the quality of the first cell reference signal, whether the radio downlink failure occurs on the first radio link. A specific implementation process includes: determining whether the quality of the first cell reference signal is less than a preset threshold; if the quality of the first cell reference signal is less than the preset threshold, counting a quantity of low power times, and determining whether the quantity of low power times is greater than or equal to a preset quantity of times, where the quantity of low power times is a quantity of times that quality of first cell reference signals is less than the preset threshold; and if the quantity of low power times is greater than or equal to the preset quantity of times, determining that the radio downlink failure occurs on the first radio link.

The preset threshold may be customized by a user based on an actual requirement, or may be set on the UE by default. This is not limited in this embodiment of the present invention.

The preset quantity of times may be customized by a user based on an actual requirement, or may be set on the UE by default. This is not limited in this embodiment of the present invention.

When the quality of the first cell reference signal is less than the preset threshold, it indicates that radio downlink quality of the first radio link is relatively poor. However, in an actual implementation process, because the radio downlink quality may become poor temporarily but no radio downlink failure actually occurs on the radio downlink, if it is determined that the radio downlink failure occurs on the first radio link once it is detected that the quality of the first cell reference signal is less than the preset threshold, misjudgment is caused.

Therefore, to accurately determine whether the radio downlink failure actually occurs on the first radio link, the UE counts a quantity of times that quality of first cell reference signals is less than the preset threshold. If the quantity of low power times is greater than or equal to the preset quantity of times, in other words, quality of the first cell reference signal remains less than the preset threshold, it may be determined that the radio downlink failure occurs on the first radio link.

Step 202: If it is detected that the radio downlink failure occurs on the first radio link, start a physical-layer-monitored automatic-recovery process for the first radio link and start a Radio Link Control RRC connection re-setup process to set up a second radio link.

Figure 2B:
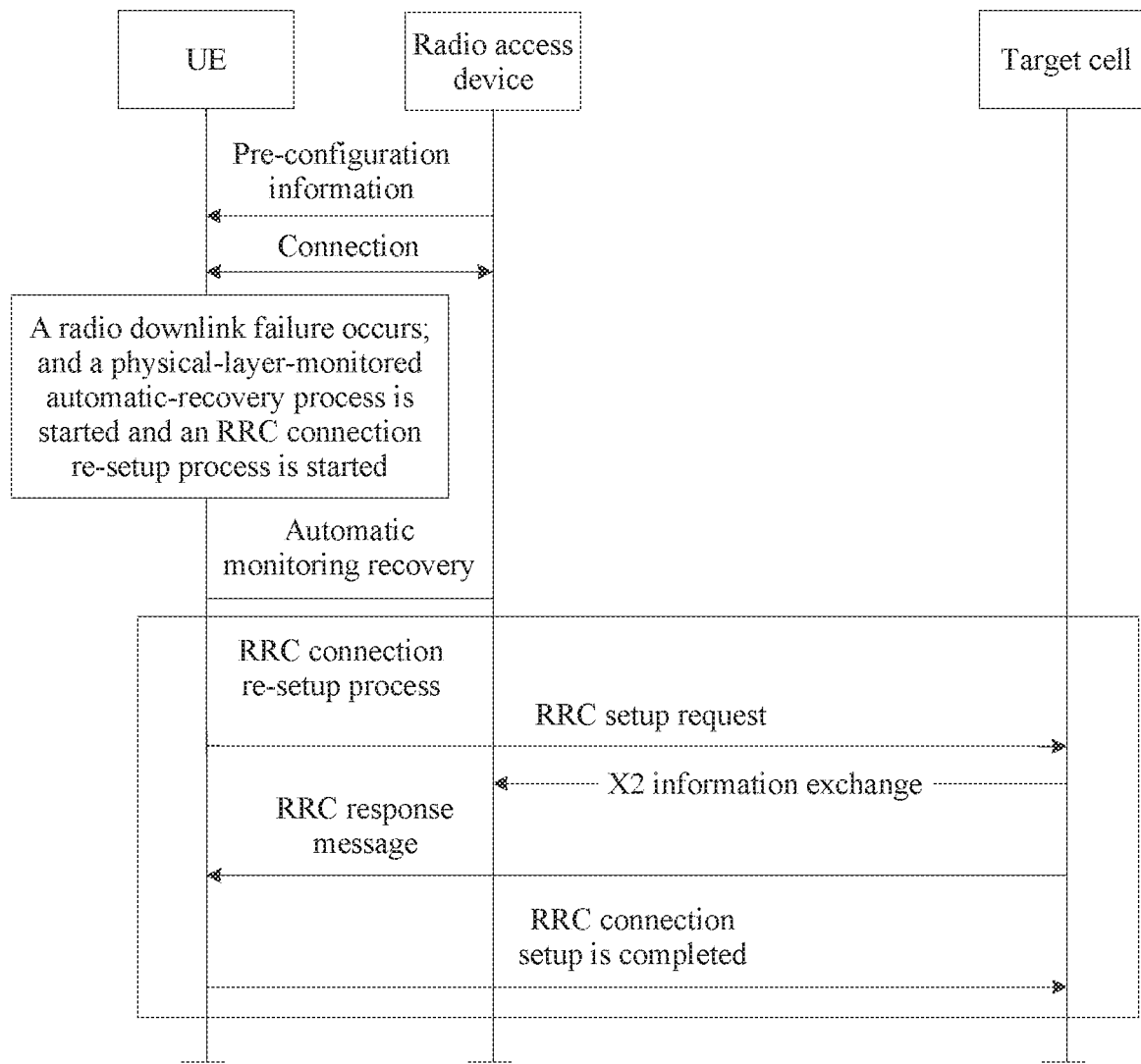
FIG. 2B is a flowchart of a method for recovering from a radio downlink failure that is related to the embodiment in FIG. 2A.

The recovery from the radio downlink failure needs to be made if the radio downlink failure occurs on the first radio link. Referring to FIG. 2B, in this embodiment of the present invention, the UE starts a physical-layer-monitored automatic-recovery process for the first radio link and starts the RRC connection re-setup process to set up the second radio link.

That the UE starts the physical-layer-monitored automatic-recovery process for the first radio link and starts the RRC connection re-setup process to set up the second radio link may be implemented in either of the following implementations based on different starting occasions.

Manner 1: When it is detected that the radio downlink failure occurs on the first radio link, the physical-layer-monitored automatic-recovery process is started for the first radio link and the RRC connection re-setup process is simultaneously started to set up the second radio link.

Figure 2C:
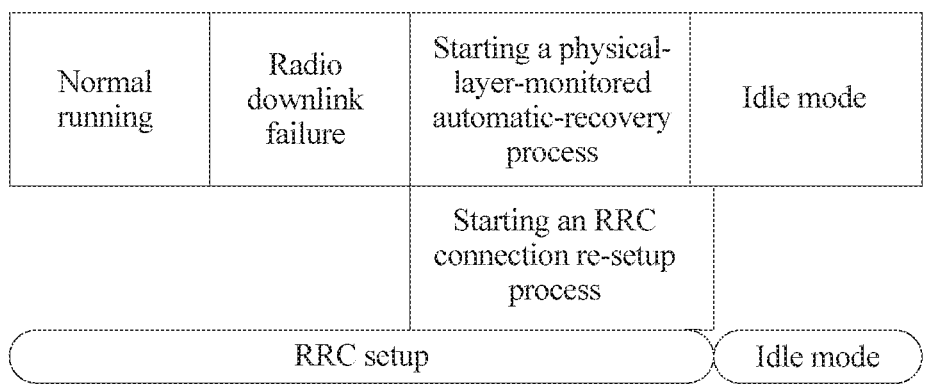
FIG. 2C is a schematic diagram of starting a physical-layer-monitored automatic-recovery process and a Radio Link Control RRC connection re-setup process that are related to the embodiment in FIG. 2A.

In this implementation, referring to FIG. 2C, when the radio downlink failure occurs on the first radio link, the UE starts a first designated timer and continues monitoring the quality of the first cell reference signal on the first radio link on which the radio downlink failure currently occurs. The first designated timer is used to time the physical-layer-monitored automatic-recovery process. For example, the first designated timer may be a T310 timer.

In addition, as described above, because the UE supports a plurality of connections, in this embodiment of the present invention, the UE starts a second designated timer, selects a target cell from a plurality of neighboring cells according to a designated policy, and sends an RRC setup request to a radio access device to which the target cell belongs, to set up the second radio link. The second designated timer is used to time the RRC connection re-setup process. For example, the second designated timer may be a T311 timer.

The designated policy may be customized by a user based on an actual requirement, or may be set on the UE by default. This is not limited in this embodiment of the present invention.

It should be noted that a running time length of the first designated timer and a running time length of the second designated timer may be set to different values.

Manner 2: The physical-layer-monitored automatic-recovery process is started for the first radio link when it is detected that the radio downlink failure occurs on the first radio link, and the RRC connection re-setup process is started when the physical-layer-monitored automatic-recovery process meets a preset condition, to set up the second radio link.

Figure 2D:
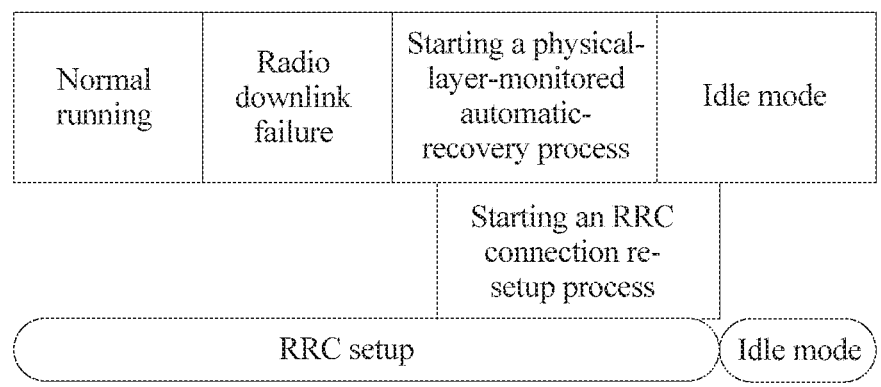
FIG. 2D is another schematic diagram of starting a physical-layer-monitored automatic-recovery process and a Radio Link Control RRC connection re-setup process that are related to the embodiment in FIG. 2A.

To be specific, a difference from the first implementation is as follows: In this implementation, referring to FIG. 2D, the physical-layer-monitored automatic-recovery process and the RRC connection re-setup process are not simultaneously started when the radio downlink failure occurs on the first radio link. Instead, the physical-layer-monitored automatic-recovery process is first started for the first radio link, and the RRC connection re-setup process is then when it is detected that the physical-layer-monitored automatic-recovery process meets the preset condition, to set up the second radio link.

Based on different preset conditions, whether the physical-layer-monitored automatic-recovery process meets the preset condition is determined in the following implementations (1) and (2).

(1) A running time length of the physical-layer-monitored automatic-recovery process is measured, and when the measured running time length reaches a first preset time length and the first radio link is still in a radio downlink failure state, it is determined that the physical-layer-monitored automatic-recovery process meets the preset condition.

The first preset time length may be customized by a user based on an actual requirement, or may be set on the UE by default. This is not limited in this embodiment of the present disclosure.

The RRC connection re-setup process does not need to be started if the first radio link on which the radio downlink failure currently occurs automatically recovers within the first preset time length. However, if the running time length of the physical-layer-monitored automatic-recovery process reaches the first preset time length, and the first radio link is still in the radio downlink failure state, it indicates that the first radio link on which the radio downlink failure currently occurs fails to automatically recover within the first preset time length. In this case, it is determined that the physical-layer-monitored automatic-recovery process meets the preset condition. The RRC connection re-setup process is started to set up the second radio link.

(2) A quantity of out-of-synchronization indications is counted, and when the quantity of out-of-synchronization indications reaches a preset quantity, it is determined that the physical-layer-monitored automatic-recovery process meets the preset condition, and the out-of-synchronization indication is generated when it is detected that the quality of the first cell reference signal on the first radio link is lower than preset quality.

The preset quantity may be customized by a user based on an actual requirement, or may be set on the UE by default. This is not limited in this embodiment of the present invention.

The out-of-synchronization indication may be generated by a physical layer of the UE when the physical layer detects that the quality of the first cell reference signal on the first radio link is lower than the preset quality. To be specific, if the UE still detects, after the UE starts the physical-layer-monitored automatic-recovery process, that the quality of the first cell reference signal on the first radio link is lower than the preset quality, and the quantity of out-of-synchronization indications reaches the preset quantity, it indicates that the first radio link fails to automatically recover. Therefore, the UE determines that the physical-layer-monitored automatic-recovery process meets the preset condition. The RRC connection re-setup process is started to set up the second radio link.

Further, in some application scenarios such as an ultra-reliable and low latency service (URLLC), a latency requirement is usually relatively high. Therefore, in this embodiment of the present invention, when the physical-layer-monitored automatic-recovery process and the RRC connection re-setup process are being started, running or setup time lengths of the physical-layer-monitored automatic-recovery process and the RRC connection re-setup process may be further optimized in the following specific implementations (3) and (4).

(3) A broadcast message sent by an accessed radio access device is received before the physical-layer-monitored automatic-recovery process is started, the broadcast message carries a first designated correspondence, the first designated correspondence is used to indicate a correspondence between a plurality of service types and a plurality of second preset time lengths, each second preset time length is a running time length of a first designated timer that is corresponding to each service type in the physical-layer-monitored automatic-recovery process, and the first designated timer is used to time the physical-layer-monitored automatic-recovery process.

The plurality of second preset time lengths may be all customized by a user based on an actual requirement, or may be set on the radio access device by default. This is not limited in this embodiment of the present invention.

To be specific, the running time length of the first designated timer may be set to different values based on different service types. Generally, the correspondence between a plurality of service types and a plurality of second preset time lengths needs to be determined by the radio access device. In addition, the radio access device sends the broadcast message to the UE before the physical-layer-monitored automatic-recovery process is started, to send the correspondence between a plurality of service types and a plurality of second preset time lengths to the UE. In a possible implementation, the radio access device may add the first designated correspondence to a system information block (System Information Block, SIB) 2 of the broadcast message.

Correspondingly, the UE receives the broadcast message sent by the radio access device, and when the physical-layer-monitored automatic-recovery process needs to be started, the UE starts the physical-layer-monitored automatic-recovery process based on a service type of a to-be-transmitted service and the first designated correspondence.

To be specific, the UE determines, in the first designated correspondence based on the service type of the to-be-transmitted service, the second preset time length corresponding to the service type, starts the physical-layer-monitored automatic-recovery process for the first radio link, and sets the running time length of the first designated timer to the determined second preset time length.

For example, if the service type of the to-be-transmitted service is a URLLC type, and a second preset time length corresponding to the URLLC type is Ti, the running time length of the physical-layer-monitored automatic-recovery process is set to Ti when the physical-layer-monitored automatic-recovery process is started. Generally, the second preset time length corresponding to the URLLC type is relatively short.

(4) Pre-configuration information sent by an accessed radio access device is received before the RRC connection re-setup process is started, the pre-configuration information includes a timing advance (Timing Advance, TA) list and resource pool information of a plurality of cells, the TA list is used to store advanced time required for sending a signal to each cell in the plurality of cells, the resource pool information is used to indicate an uplink resource required for transmitting a signal to each cell in the plurality of cells, and the plurality of cells include a cell managed by the radio access device and/or a cell managed by another radio access device connected to the radio access device.

Generally, when the RRC connection re-setup process is being started, because the UE needs to learn of time and an uplink resource for sending an RRC setup request to the radio access device to which the target cell belongs, generally, the UE needs to perform a random access channel (RACH) process before an RRC connection is set up, to be specific, the UE needs to send a RACH request to the radio access device to which the target cell belongs, so that the radio access device to which the target cell belongs returns advanced time and an uplink resource that are corresponding to the target cell. The advanced time is advanced time required for transmitting an uplink signal to the target cell, in other words, advanced time required for sending the RRC setup request to the radio access device to which the target cell belongs. However, in this way, the RRC connection re-setup process is time-consuming.

Therefore, referring to FIG. 2B, in this embodiment of the present invention, the radio access device determines pre-configuration information based on stored first information and second information when detecting access of the UE, the first information includes advanced time and information about an uplink resource that are required for sending a signal to each managed cell, and the second information includes advanced time and information about an uplink resource that are required for sending a signal to each cell managed by a radio access device connected to the radio access device. Then, the radio access device sends the pre-configuration information to the UE.

Correspondingly, the UE receives the pre-configuration information sent by the radio access device. In this way, when the UE needs to start the RRC connection re-setup process, the UE can directly determine, based on the pre-configuration information obtained in advance, time and a required uplink resource for sending the RRC setup request to the target cell. In other words, the UE starts the RRC connection re-setup process based on the timing advance TA list and the resource pool information to set up the second radio link.

Before the RRC connection re-setup process is started, the radio access device sends, to the UE, the pre-configuration information that includes the TA list and the resource pool information, so that the UE directly determines, based on the pre-configuration information obtained in advance, the time and the required uplink resource for sending the RRC setup request to the target cell, thereby reducing time consumed by the RRC connection re-setup process, to reduce time of the recovery from the radio downlink failure.

An implementation process in which the radio access device determines the pre-configuration information based on the stored first information and second information includes: determining, by the radio access device, the TA list based on the first information, the second information, location information of the UE, and information indicating whether the UE has a capability of supporting uplink synchronization without the need of random access. In addition, the radio access device determines the resource pool information based on the first information, the second information, network load, and the like.

In addition, before determining the pre-configuration information based on the stored first information and second information, the radio access device receives and stores the second information sent by the radio access device connected to the radio access device.

In a possible implementation, when the radio access device transmits information with another radio access device connected to the radio access device, the another radio access device can send the second information to the radio access device.

Further, the broadcast message may further carry a second designated correspondence, the second designated correspondence is used to indicate a correspondence between a plurality of service types and a plurality of third preset time lengths, each third preset time length is a running time length of a second designated timer that is corresponding to each service type in the RRC connection re-setup process, and the second designated timer is used to time the RRC connection re-setup process.

The plurality of third preset time lengths may be all customized by a user based on an actual requirement, or may be set on the radio access device by default. This is not limited in this embodiment of the present invention.

In this case, an implementation process in which the UE starts the RRC connection re-setup process based on the timing advance TA list and the resource pool information to set up the second radio link includes: determining, by the UE in the second designated correspondence based on the service type of the to-be-transmitted service, a third preset time length corresponding to the service type, starting the RRC connection re-setup process to set up the second radio link, and setting a running time length of a second designated timer to the determined third preset time length.

It should be noted that, for specific implementation of the physical-layer-monitored automatic-recovery process and the RRC connection re-setup process, reference may be made to the prior art. Details are not described in this embodiment of the present invention.

Step 203: Recover from the radio downlink failure through either of the physical-layer-monitored automatic-recovery process and the RRC connection re-setup process.

After the UE starts the physical-layer-monitored automatic-recovery process and the RRC connection re-setup process, once it is detected that either of the physical-layer-monitored automatic-recovery process and the RRC connection re-setup process is first completed, a radio link obtained through the first completed process may be determined as the first radio link. Based on different sequences of completing the physical-layer-monitored automatic-recovery process and the RRC connection re-setup process, the recovery from the radio downlink failure may be made through either of the physical-layer-monitored automatic-recovery process and the RRC connection re-setup process in the following several possible implementations.

Manner 1: When it is detected that the physical-layer-monitored automatic-recovery process is successfully implemented, the RRC connection re-setup process is stopped and a radio link obtained after a recovery from the radio downlink failure is made through the physical-layer-monitored automatic-recovery process is determined as the first radio link.

When it is detected that the physical-layer-monitored automatic-recovery process is successfully implemented, it indicates that before RRC connection re-setup is completed, the UE detects that the first radio link automatically recovers. In this case, the RRC connection may not need to be set up. Therefore, the UE stops the RRC connection re-setup process.

In a possible implementation, that the UE stops the RRC connection re-setup process may include the following steps 2031 to 2035.

Step 2031: The UE sends an RRC cancellation indication to an accessed radio access device, where the RRC cancellation indication carries an identifier of a target cell, the target cell is a cell selected in the RRC connection re-setup process, and the RRC cancellation indication is used to instruct the radio access device to cancel the RRC connection re-setup process based on the identifier of the target cell, to stop the RRC connection re-setup process.

Step 2032: The radio access device receives the Radio Link Control RRC cancellation indication sent by the UE.

Step 2033: The radio access device determines, based on the identifier of the target cell, whether the target cell belongs to a managed cell.

Step 2034: If the target cell belongs to the managed cell, the radio access device stops RRC connection re-setup between the target cell and the UE.

To be specific, if the target cell belongs to a cell managed by the radio access device, the radio access device can directly stop RRC connection re-setup between the target cell and the UE.

Step 2035: If the target cell does not belong to the managed cell, the radio access device sends an RRC connection cancellation request to the radio access device to which the target cell belongs, where the RRC connection cancellation request is used to instruct the radio access device to which the target cell belongs to stop RRC connection re-setup between the target cell and the UE.

Referring to FIG. 2B, if the UE has sent, when the physical-layer-monitored automatic-recovery process is successfully implemented, the RRC setup request to the radio access device to which the target cell belongs, the RRC connection re-setup process may be canceled through an X2 interface between radio access devices. To be specific, the UE sends the RRC cancellation indication to the radio access device, and the radio access device sends, through the X2 interface based on the identifier of the target cell that is carried in the RRC cancellation indication, the RRC connection cancellation request to the radio access device to which the target cell belongs, to cancel the RRC connection re-setup process.

Alternatively, in another possible implementation, if the UE has not sent, when the physical-layer-monitored automatic-recovery process is successfully implemented, the RRC setup request to the radio access device to which the target cell belongs, the RRC connection re-setup process may be canceled through an interface between the UE and the radio access device. To be specific, the UE sends an RRC cancellation request to the radio access device to which the target cell belongs, to cancel the RRC connection re-setup process.

Manner 2: When it is detected that the RRC connection re-setup process is successfully implemented, the physical-layer-monitored automatic-recovery process is stopped and the second radio link is determined as the first radio link.

When it is detected that the RRC connection re-setup process is successfully implemented, it indicates that before the first radio link on which the radio downlink failure occurs automatically recovers, the RRC connection re-setup process is completed, in other words, the second radio link is set up. In this case, the UE determines the second radio link as the first radio link, in other words, the UE subsequently transmits a to-be-transmitted service by using the setup second radio link. In this case, the UE may stop the physical-layer-monitored automatic-recovery process. In other words, the UE disables the first designated timer.

Manner 3: When it is detected that both the physical-layer-monitored automatic-recovery process and the RRC connection re-setup process are successfully implemented, quality of a second cell reference signal and quality of a third cell reference signal are determined, and a radio link corresponding to a cell reference signal with highest quality in the second cell reference signal and the third cell reference signal is determined as the first radio link, where the second cell reference signal is a cell reference signal corresponding to a radio link obtained after a recovery from the radio downlink failure is made through the physical-layer-monitored automatic-recovery process, and the third cell reference signal is a cell reference signal corresponding to the second radio link.

In a possible implementation, if the UE has sent, when the physical-layer-monitored automatic-recovery process is successfully implemented, the RRC setup request to the radio access device to which the target cell belongs, and the RRC connection re-setup process cannot be successfully canceled, both the physical-layer-monitored automatic-recovery process and the RRC connection re-setup process are successfully implemented.

When it is detected that both the physical-layer-monitored automatic-recovery process and the RRC connection re-setup process are successfully implemented, the UE can select, based on quality of a cell reference signal on a radio link obtained after the recovery from the radio downlink failure is made through each process, a radio link obtained through a specific process, to recover from the radio downlink failure.

Because a larger value of quality of a cell reference signal indicates better service transmission performance of a radio link corresponding to the cell reference signal, in this embodiment of the present invention, when it is detected that both the physical-layer-monitored automatic-recovery process and the RRC connection re-setup process are successfully implemented, the quality of the second cell reference signal and the quality of the third cell reference signal are determined, and the radio link corresponding to the cell reference signal with highest quality in the second cell reference signal and the third cell reference signal is determined as the first radio link.

It should be noted that, the foregoing is described by using an example in which the radio link corresponding to the cell reference signal with highest quality in the second cell reference signal and the third cell reference signal is determined as the first radio link. In another embodiment, the UE can make the recovery from the radio downlink failure according to another policy when it is detected that both the physical-layer-monitored automatic-recovery process and the RRC connection re-setup process are successfully implemented.

For example, in a possible implementation, the UE may make a selection based on signal strength of the second cell reference signal and signal strength of the third cell reference signal. The signal strength may be measured by using reference signal received power (Reference Signal Received Power, RSRP).

Alternatively, the UE may make a selection based on an implementing sequence of the physical-layer-monitored automatic-recovery process and the RRC connection re-setup process. Alternatively, the UE may randomly select a radio link as the first radio link from the second radio link and the radio downlink obtained after the recovery from the radio downlink failure is made through the physical-layer-monitored automatic-recovery process. This is not limited in this embodiment of the present invention.

As such, the method for recovering from a radio downlink failure in this embodiment of the present invention is implemented. In addition, the method in this embodiment of the present invention further includes the following step 204 and step 205.

Step 204: Determine a target preset time length, where the target preset time length is a maximum value of the second preset time length and the third preset time length.

Step 205: Enter an idle mode when the first radio link is still in a radio downlink failure state after the target preset time length expires, where the idle mode is used to indicate that the recovery from the radio downlink failure fails.

To be specific, when the recovery from the radio downlink failure is being made through either of the physical-layer-monitored automatic-recovery process and the RRC connection re-setup process, the UE enters the idle (idle) mode if the recovery has not been made after a timer with a longest time length in the physical-layer-monitored automatic-recovery process and the RRC connection re-setup process, and therefore, it indicates that the recovery from the radio downlink failure fails. For details, refer to FIG. 2C or FIG. 2D.

In this embodiment of the present invention, the currently connected first radio link is monitored to determine whether the radio downlink failure occurs on the first radio link. If it is detected that the radio downlink failure occurs on the first radio link, the UE starts, in parallel, the physical-layer-monitored automatic-recovery process and the RRC connection re-setup process, to make the recovery from the radio downlink failure through either of the physical-layer-monitored automatic-recovery process and the RRC connection re-setup process. In this way, in a process of making the recovery from the radio downlink failure, the physical-layer-monitored automatic-recovery process is prevented from consuming relatively long time when the first radio link cannot automatically recover. The recovery from the radio downlink failure is made through either of the physical-layer-monitored automatic-recovery process and the RRC connection re-setup process, to reduce recovery time, thereby meeting a latency requirement of an ultra-reliable and low latency service.

Figure 3A:
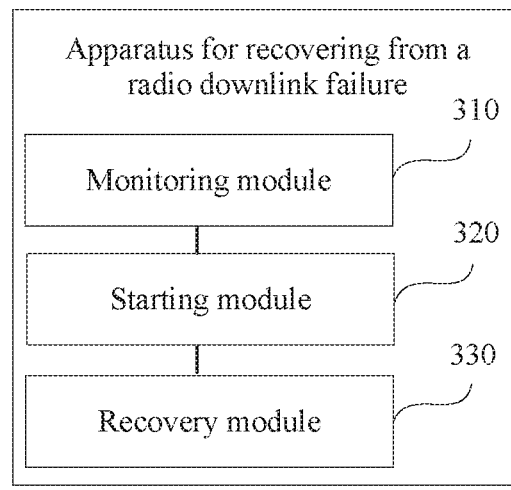
FIG. 3A is a schematic structural diagram of an apparatus for recovering from a radio downlink failure according to an example embodiment.

FIG. 3A is a schematic structural diagram of an apparatus for recovering from a radio downlink failure according to an example embodiment. The apparatus for recovering from a radio downlink failure may be implemented as a part or all of UE by software, hardware, or a combination of software and hardware. The apparatus for recovering from a radio downlink failure may include a monitoring module 310, a starting module 320, and a recovery module 330. In addition, the monitoring module 310, the starting module 320, and the recovery module 330 are equivalent to the processor 104 in FIG. 1B.

The monitoring module 310 is configured to perform step 201 in the foregoing embodiment in FIG. 2A.

The starting module 320 is configured to perform step 202 in the foregoing embodiment in FIG. 2A.

The recovery module 330 is configured to perform step 203 in the foregoing embodiment in FIG. 2A.

Optionally, the starting module 330 includes a first start unit and a second start unit.

The first start unit is configured to perform Manner 1 of step 202 in the foregoing embodiment in FIG. 2A.

The second start unit is configured to perform Manner 2 of step 202 in the foregoing embodiment in FIG. 2A.

Optionally, the starting module 330 further includes a first determining unit and a second determining unit.

The first determining unit is configured to perform Implementation (1) of step 202 in the foregoing embodiment in FIG. 2A.

The second determining unit is configured to perform Implementation (2) of step 202 in the foregoing embodiment in FIG. 2A.

Optionally, the recovery module 340 includes a third determining unit, a fourth determining unit, and a fifth determining unit.

The third determining unit is configured to perform Manner 1 of step 203 in the foregoing embodiment in FIG. 2A.

The fourth determining unit is configured to perform Manner 2 of step 203 in the foregoing embodiment in FIG. 2A.

The fifth determining unit is configured to perform Manner 3 of step 203 in the foregoing embodiment in FIG. 2A.

Optionally, the recovery module 330 further includes a sending unit.

The sending unit is configured to send an RRC cancellation indication to an accessed radio access device, where the RRC cancellation indication carries an identifier of a target cell, the target cell is a cell selected in the RRC connection re-setup process, and the RRC cancellation indication is used to instruct the radio access device to cancel the RRC connection re-setup process based on the identifier of the target cell, to stop the RRC connection re-setup process.

Optionally, the starting module 320 further includes a first receiving unit and a third start unit.

The first receiving unit is configured to perform Implementation (4) of step 202 in the foregoing embodiment in FIG. 2A.

The third start unit is configured to start the RRC connection re-setup process based on the timing advance TA list and the resource pool information to set up the second radio link.

Optionally, the starting module 320 further includes a second receiving unit, a sixth determining unit, and a first setting unit.

The second receiving unit is configured to perform Implementation (3) of step 202 in the foregoing embodiment in FIG. 2A.

The sixth determining unit is configured to determine, in the first designated correspondence based on a service type of a to-be-transmitted service, a second preset time length corresponding to the service type.

The first setting unit is configured to: start the physical-layer-monitored automatic-recovery process for the first radio link and set the running time length of the first designated timer to the determined second preset time length.

Optionally, the starting module 320 further includes a seventh determining unit, configured to determine, in the second designated correspondence based on the service type of the to-be-transmitted service, a third preset time length corresponding to the service type. The starting module 320 further includes a second setting unit, configured to: start the RRC connection re-setup process to set up the second radio link and set the running time length of the second designated timer to the determined third preset time length.

Figure 3B:
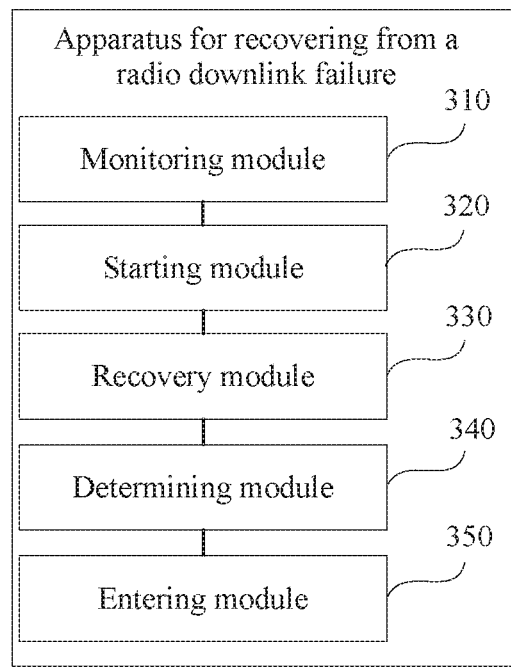
FIG. 3B is a schematic structural diagram of an apparatus for recovering from a radio downlink failure according to another example embodiment.

Optionally, referring to FIG. 3B, the apparatus further includes a determining module 340 and an entering module 350.

The determining module 340 is configured to perform step 204 in the foregoing embodiment in FIG. 2A.

The entering module 350 is configured to perform step 205 in the foregoing embodiment in FIG. 2A.

In this embodiment of the present invention, the currently connected first radio link is monitored to determine whether the radio downlink failure occurs on the first radio link. If it is detected that the radio downlink failure occurs on the first radio link, the UE starts, in parallel, the physical-layer-monitored automatic-recovery process and the RRC connection re-setup process, to make the recovery from the radio downlink failure through either of the physical-layer-monitored automatic-recovery process and the RRC connection re-setup process. In this way, in a process of making the recovery from the radio downlink failure, the physical-layer-monitored automatic-recovery process is prevented from consuming relatively long time when the first radio link cannot automatically recover. The recovery from the radio downlink failure is made through either of the physical-layer-monitored automatic-recovery process and the RRC connection re-setup process, to reduce recovery time, thereby meeting a latency requirement of an ultra-reliable and low latency service.

Figure 4A:
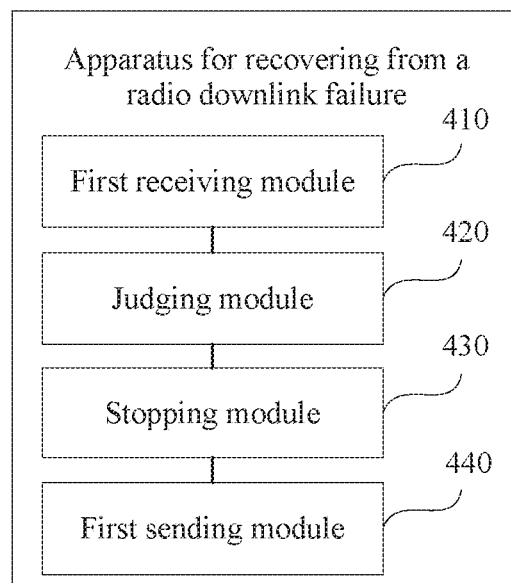
FIG. 4A is a schematic structural diagram of an apparatus for recovering from a radio downlink failure according to an example embodiment.

FIG. 4A is a schematic structural diagram of an apparatus for recovering from a radio downlink failure according to an example embodiment. The apparatus for recovering from a radio downlink failure may be implemented as a part or all of a radio access device by software, hardware, or a combination of software and hardware. The apparatus for recovering from a radio downlink failure may include a first receiving module 410, a judging module 420, a stopping module 430, and a first sending module 440. In addition, the first receiving module 410, the judging module 420, the stopping module 430, and the first sending module 44o are equivalent to the processor 1104 in FIG. 1C.

The first receiving module 410 is configured to perform step 2032 in the foregoing embodiment in FIG. 2A.

The judging module 420 is configured to perform step 2033 in the foregoing embodiment in FIG. 2A.

The stopping module 430 is configured to perform step 2034 in the foregoing embodiment in FIG. 2A.

The first sending module 440 is configured to perform step 2035 in the foregoing embodiment in FIG. 2A.

Figure 4B:
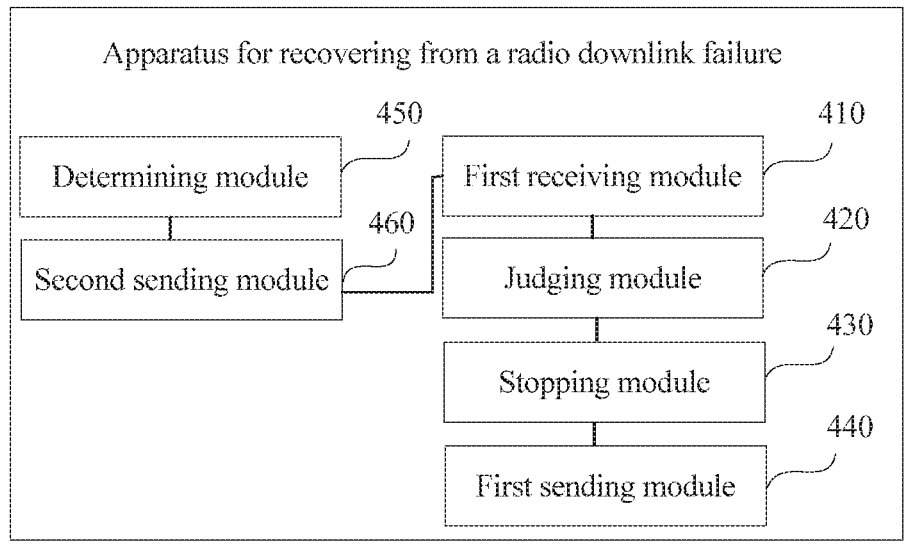
FIG. 4B is a schematic structural diagram of an apparatus for recovering from a radio downlink failure according to another example embodiment.
Figure 4C:
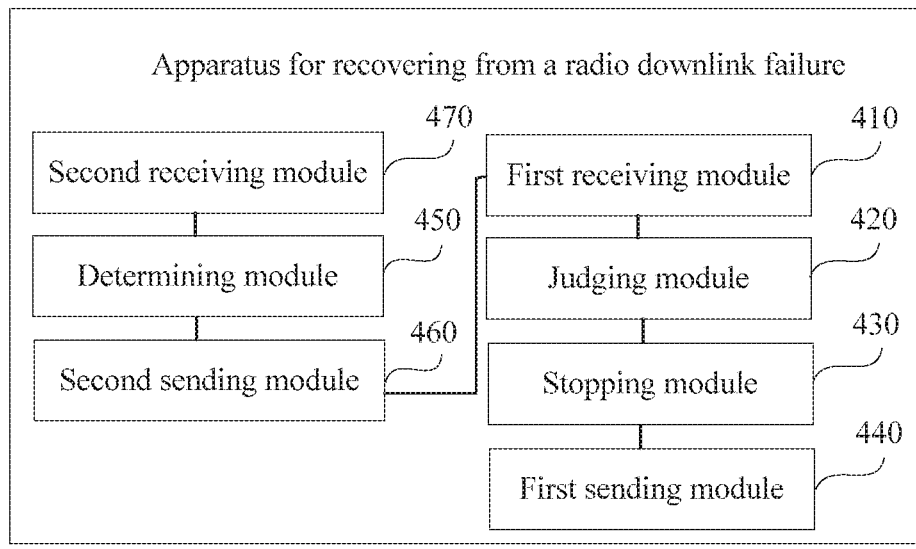
FIG. 4C is a schematic structural diagram of an apparatus for recovering from a radio downlink failure according to another example embodiment.
Figure 4D:
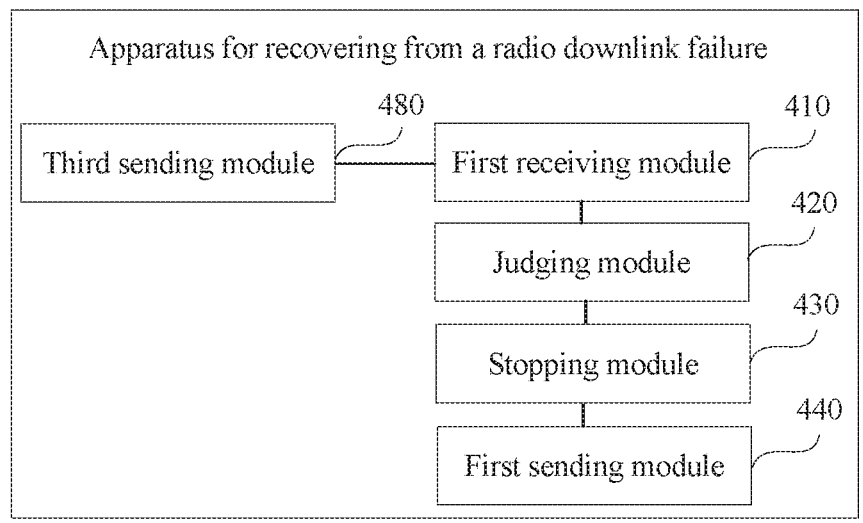
FIG. 4D is a schematic structural diagram of an apparatus for recovering from a radio downlink failure according to another example embodiment.

Optionally, referring to FIG. 4B to FIG. 4D, the apparatus further includes a determining module 450, configured to determine pre-configuration information based on stored first information and second information when access of the UE is detected, where the first information includes advanced time and information about an uplink resource that are required for sending a signal to each managed cell, and the second information includes advanced time and information about an uplink resource that are required for sending a signal to each cell managed by a radio access device connected to the radio access device. The apparatus further includes a second sending module 460, configured to send the pre-configuration information to the UE.

Optionally, the apparatus further includes: a second receiving module 470, configured to receive and store the second information sent by the radio access device connected to the radio access device.

Optionally, the apparatus further includes: a third sending module 480, configured to send a broadcast message to the UE.

In this embodiment of the present invention, the currently connected first radio link is monitored to determine whether the radio downlink failure occurs on the first radio link. If it is detected that the radio downlink failure occurs on the first radio link, the UE starts, in parallel, the physical-layer-monitored automatic-recovery process and the RRC connection re-setup process, to make the recovery from the radio downlink failure through either of the physical-layer-monitored automatic-recovery process and the RRC connection re-setup process. In this way, in a process of making the recovery from the radio downlink failure, the physical-layer-monitored automatic-recovery process is prevented from consuming relatively long time when the first radio link cannot automatically recover. The recovery from the radio downlink failure is made through either of the physical-layer-monitored automatic-recovery process and the RRC connection re-setup process, to reduce recovery time, thereby meeting a latency requirement of an ultra-reliable and low latency service.

It should be noted that, division of the foregoing function modules is used only as an example for description when the apparatus for recovering from a radio downlink failure that is provided in the foregoing embodiment implements the method for recovering from a radio downlink failure. In actual application, the functions may be allocated to different function modules for implementation based on a requirement. To be specific, an internal structure of a device is divided into different function modules to complete all or some functions described above. In addition, the apparatus for recovering from a radio downlink failure that is provided in the foregoing embodiment and the embodiment of the method for recovering from a radio downlink failure belong to a same concept. For a specific implementation process, refer to the method embodiment. Details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing embodiments are not intended to limit the embodiments of the present invention. Any modification, equivalent replacement, improvement, and the like made without departing from the spirit and principle of the embodiments of the present invention shall fall within the protection scope of the embodiments of the present invention.

What is claimed is:

1. A method comprising:
   monitoring, by a user equipment a first radio link to determine when a radio downlink failure occurs on the first radio link, wherein the first radio link is connected to a radio network;
   when the radio downlink failure is detected on the first radio link, starting, by the user equipment, a physical-layer-monitored automatic-recovery process for the first radio link in parallel with starting a Radio Link Control Radio Resource Control (RRC) connection re-setup process to set up a second radio link;
   performing, after the starting the physical-layer-monitored automatic-recovery process, and after starting the Radio Link Control RRC connection re-setup process to set up the second radio link:
     determining a target preset time length; and
     entering an idle mode when the first radio link is still in a radio downlink failure state after the target preset time length expires, wherein the idle mode indicates that recovery from the radio downlink failure failed; and
   recovering from the radio downlink failure through the physical-layer-monitored automatic-recovery process or the Radio Link Control RRC connection re-setup process.

2. The method according to claim 1, wherein starting the physical-layer-monitored automatic-recovery process for the first radio link in parallel with starting the Radio Link Control RRC connection re-setup process to set up a second radio link comprises:
   when the radio downlink failure is detected on the first radio link, starting the physical-layer-monitored automatic-recovery process for the first radio link and simultaneously starting the Radio Link Control RRC connection re-setup process; or
   starting the physical-layer-monitored automatic-recovery process for the first radio link when the radio downlink failure is detected on the first radio link, and starting the Radio Link Control RRC connection re-setup process when the physical-layer-monitored automatic-recovery process meets a preset condition.

3. The method according to claim 2, wherein starting the physical-layer-monitored automatic-recovery process for the first radio link in parallel with starting the Radio Link Control RRC connection re-setup process to set up a second radio link comprises starting the physical-layer-monitored automatic-recovery process for the first radio link when the radio downlink failure is detected on the first radio link, and starting the Radio Link Control RRC connection re-setup process when the physical-layer-monitored automatic-recovery process meets the preset condition; and
   wherein before the physical-layer-monitored automatic-recovery process meets the preset condition, the method further comprises:
     measuring a running time length of the physical-layer-monitored automatic-recovery process, and when the running time length reaches a first preset time length and the radio downlink failure is still occurring on the first radio link, determining that the physical-layer-monitored automatic-recovery process meets the preset condition; or
     counting a quantity of out-of-synchronization indications, and when the quantity of out-of-synchronization indications reaches a preset quantity, determining that the physical-layer-monitored automatic-recovery process meets the preset condition, wherein the out-of-synchronization indications are generated when a quality of a first cell reference signal on the first radio link is lower than preset quality.

4. The method according to claim 2, wherein recovering from the radio downlink failure through the physical-layer-monitored automatic-recovery process or the Radio Link Control RRC connection re-setup process comprises:
   when the physical-layer-monitored automatic-recovery process is successful, stopping the Radio Link Control RRC connection re-setup process and determining, as the first radio link, a radio link obtained after a recovery from the radio downlink failure is made through the physical-layer-monitored automatic-recovery process;
   when the Radio Link Control RRC connection re-setup process is successful, stopping the physical-layer-monitored automatic-recovery process and determining the second radio link as the first radio link; or
   when both the physical-layer-monitored automatic-recovery process and the Radio Link Control RRC connection re-setup process are successful, determining a quality of a second cell reference signal and a quality of a third cell reference signal, and determining a radio link corresponding to a cell reference signal with a higher quality of the second cell reference signal and the third cell reference signal as the first radio link, wherein the second cell reference signal is a cell reference signal corresponding to a radio link obtained after a recovery from the radio downlink failure is made through the physical-layer-monitored automatic-recovery process, and the third cell reference signal is a cell reference signal corresponding to the second radio link.

5. The method according to claim 4, wherein the stopping the Radio Link Control RRC connection re-setup process comprises:
sending an Radio Link Control RRC cancellation indication to an accessed radio access device, wherein the Radio Link Control RRC cancellation indication carries an identifier of a target cell, the target cell is a cell selected in the Radio Link Control RRC connection re-setup process, and the Radio Link Control RRC cancellation indication instructs the accessed radio access device to cancel the Radio Link Control RRC connection re-setup process in accordance with the identifier of the target cell.

6. The method according to claim 2, wherein before the starting the Radio Link Control RRC connection re-setup process to set up the second radio link, the method further comprises:
receiving pre-configuration information from an accessed radio access device, wherein the pre-configuration information comprises a timing advance (TA) list and resource pool information of a plurality of cells, the TA list stores advanced time for sending a signal to each cell in the plurality of cells, the resource pool information indicates an uplink resource for transmitting a signal to each cell in the plurality of cells, and the plurality of cells comprise a cell managed by the accessed radio access device or a cell managed by another radio access device connected to the accessed radio access device; and
starting the Radio Link Control RRC connection re-setup process to set up the second radio link comprises starting the Radio Link Control RRC connection re-setup process in accordance with the TA list and the resource pool information.

7. The method according to claim 2, wherein before starting the physical-layer-monitored automatic-recovery process for the first radio link, the method further comprises:
receiving a broadcast message sent by an accessed radio access device, wherein the broadcast message carries a first designated correspondence, the first designated correspondence indicates a correspondence between a plurality of service types and a plurality of second preset time lengths, each of the plurality of second preset time lengths is a running time length of a first designated timer corresponding to a respective service type in the physical-layer-monitored automatic-recovery process, and the first designated timer times the physical-layer-monitored automatic-recovery process; and
starting the physical-layer-monitored automatic-recovery process for the first radio link comprises:
determining, in the first designated correspondence according to a service type of a to-be-transmitted service, a determined one of the plurality of second preset time lengths corresponding to the service type of the to-be-transmitted service; and
starting the physical-layer-monitored automatic-recovery process for the first radio link and setting the running time length of the first designated timer to the determined one of the plurality of second preset time lengths.

8. The method according to claim 7, wherein the broadcast message carries a second designated correspondence, the second designated correspondence indicates a correspondence between a plurality of service types and a plurality of third preset time lengths, each of the plurality of third preset time lengths is a running time length of a second designated timer corresponding to a respective service type in the Radio Link Control RRC connection re-setup process, and the second designated timer times the Radio Link Control RRC connection re-setup process; and
starting the Radio Link Control RRC connection re-setup process to set up the second radio link comprises:
determining, in the second designated correspondence according to the service type of the to-be-transmitted service, a determined one of the plurality of third preset time lengths corresponding to the service type of the to-be-transmitted service; and
starting the Radio Link Control RRC connection re-setup process to set up the second radio link and setting the running time length of the second designated timer to the determined one of the plurality of third preset time lengths.

9. The method according to claim 8, wherein
the target preset time length is a maximum value of the plurality of second preset time lengths and the plurality of third preset time lengths.

10. An apparatus comprising:
a processor; and
a non-transitory computer-readable storage medium storing a program to be executed by the processor, the program including instructions for:
monitoring a first radio link to determine when a radio downlink failure occurs on the first radio link, wherein the first radio link is connected to a radio network;
when the radio downlink failure is detected on the first radio link, starting a physical-layer-monitored automatic-recovery process for the first radio link in parallel with starting a Radio Link Control Radio Resource Control (RRC) connection re-setup process to set up a second radio link;
performing, after the starting the physical-layer-monitored automatic-recovery process, and after starting the Radio Link Control RRC connection re-setup process to set up the second radio link:
determining a target preset time length; and
entering an idle mode when the first radio link is still in a radio downlink failure state after the target preset time length expires, wherein the idle mode indicates that recovery from the radio downlink failure failed; and
recovering from the radio downlink failure through the physical-layer-monitored automatic-recovery process or the Radio Link Control RRC connection re-setup process.

11. The apparatus according to claim 10, wherein instructions comprise further instructions for:
when the radio downlink failure is detected on the first radio link, starting the physical-layer-monitored automatic-recovery process for the first radio link and simultaneously starting the Radio Link Control RRC connection re-setup process; or
starting the physical-layer-monitored automatic-recovery process for the first radio link when the radio downlink failure is detected on the first radio link, and starting the Radio Link Control RRC connection re-setup process when the physical-layer-monitored automatic-recovery process meets a preset condition.

12. The apparatus according to claim 11, wherein the instructions comprise instructions for starting the physical-layer-monitored automatic-recovery process for the first radio link when the radio downlink failure is detected on the first radio link, and starting the Radio Link Control RRC connection re-setup process when the physical-layer-monitored automatic-recovery process meets a preset condition, and wherein the instructions comprise further instructions for:
- measuring a running time length of the physical-layer-monitored automatic-recovery process, and when the running time length reaches a first preset time length and the radio downlink failure is still occurring on the first radio link, determining that the physical-layer-monitored automatic-recovery process meets the preset condition; or
- counting a quantity of out-of-synchronization indications, and when the quantity of out-of-synchronization indications reaches a preset quantity, determining that the physical-layer-monitored automatic-recovery process meets the preset condition, wherein the out-of-synchronization indications are generated when a quality of a first cell reference signal on the first radio link is lower than preset quality.

13. The apparatus according to claim 11, wherein the instructions comprise further instructions for:
- when the physical-layer-monitored automatic-recovery process is successful, stopping the Radio Link Control RRC connection re-setup process and determining, as the first radio link, a radio link obtained after a recovery from the radio downlink failure is made through the physical-layer-monitored automatic-recovery process;
- when the Radio Link Control RRC connection re-setup process is successful, stopping the physical-layer-monitored automatic-recovery process and determining the second radio link as the first radio link; or
- when both the physical-layer-monitored automatic-recovery process and the Radio Link Control RRC connection re-setup process are successful, determining a quality of a second cell reference signal and a quality of a third cell reference signal, and determining a radio link corresponding to a cell reference signal with a higher quality of the second cell reference signal and the third cell reference signal as the first radio link, wherein the second cell reference signal is a cell reference signal corresponding to a radio link obtained after a recovery from the radio downlink failure is made through the physical-layer-monitored automatic-recovery process, and the third cell reference signal is a cell reference signal corresponding to the second radio link.

14. The apparatus according to claim 13, wherein the instructions comprise further instructions for:
- sending an Radio Link Control RRC cancellation indication to an accessed radio access device, wherein the Radio Link Control RRC cancellation indication carries an identifier of a target cell, the target cell is a cell selected in the Radio Link Control RRC connection re-setup process, and the Radio Link Control RRC cancellation indication instructs the accessed radio access device to cancel the Radio Link Control RRC connection re-setup process in accordance with the identifier of the target cell.

15. The apparatus according to claim 11, wherein the instructions comprise further instructions for:
- receiving pre-configuration information from an accessed radio access device, wherein the pre-configuration information comprises a timing advance (TA) list and resource pool information of a plurality of cells, the TA list stores advanced time for sending a signal to each cell in the plurality of cells, the resource pool information indicates an uplink resource for transmitting a signal to each cell in the plurality of cells, and the plurality of cells comprise a cell managed by the accessed radio access device or a cell managed by another radio access device connected to the accessed radio access device; and
- starting the Radio Link Control RRC connection re-setup process to set up the second radio link comprises starting the Radio Link Control RRC connection re-setup process in accordance with the TA list and the resource pool information.

16. The apparatus according to claim 11, wherein the instructions comprise further instructions for:
- receiving a broadcast message sent by an accessed radio access device, wherein the broadcast message carries a first designated correspondence, the first designated correspondence indicates a correspondence between a plurality of service types and a plurality of second preset time lengths, each of the plurality of second preset time lengths is a running time length of a first designated timer corresponding to a respective service type in the physical-layer-monitored automatic-recovery process, and the first designated timer times the physical-layer-monitored automatic-recovery process; and
- determining, in the first designated correspondence according to a service type of a to-be-transmitted service, a determined one of the plurality of second preset time lengths corresponding to the service type of the to-be-transmitted service; and
- starting the physical-layer-monitored automatic-recovery process for the first radio link and setting the running time length of the first designated timer to the determined one of the plurality of second preset time lengths.

17. The apparatus according to claim 16, wherein the broadcast message carries a second designated correspondence, the second designated correspondence indicates a correspondence between a plurality of service types and a plurality of third preset time lengths, each of the plurality of third preset time lengths is a running time length of a second designated timer corresponding to a respective service type in the Radio Link Control RRC connection re-setup process, and the second designated timer times the Radio Link Control RRC connection re-setup process; and
the instructions comprise further instructions for:
- determining, in the second designated correspondence according to the service type of the to-be-transmitted service, a determined one of the plurality of third preset time lengths corresponding to the service type of the to-be-transmitted service; and
- starting the Radio Link Control RRC connection re-setup process to set up the second radio link and setting the running time length of the second designated timer to the determined one of the plurality of third preset time lengths.

18. The apparatus according to claim 17, wherein the target preset time length is a maximum value of the plurality of second preset time lengths and the plurality of third preset time lengths.

* * * * *